United States Patent [19]

Ezekoye

[11] Patent Number: 5,172,888

[45] Date of Patent: Dec. 22, 1992

[54] APPARATUS FOR SEALINGLY ENCLOSING A CHECK VALVE

[75] Inventor: L. Ike Ezekoye, Wilkinsburg, Pa.

[73] Assignee: Westinghouse Electric Corp., Pittsburgh, Pa.

[21] Appl. No.: 853,158

[22] Filed: Feb. 7, 1992

[51] Int. Cl.$^5$ .............................................. F16K 15/00
[52] U.S. Cl. ................................... 251/367; 137/527.8
[58] Field of Search ...................... 137/527.8; 251/366, 251/367

[56] References Cited

U.S. PATENT DOCUMENTS 2,928,416  3/1960  Balhouse ...................... 137/527.8

FOREIGN PATENT DOCUMENTS 1013135  8/1957  Fed. Rep. of Germany ... 137/527.8
2721083  11/1978  Fed. Rep. of Germany ... 137/527.8
2721176  11/1978  Fed. Rep. of Germany ... 137/527.8
3327406  2/1985  Fed. Rep. of Germany ... 137/527.8

Primary Examiner—A. Michael Chambers
Attorney, Agent, or Firm—J. C. Spadacene; Peyton C. Watkins

[57] ABSTRACT

Apparatus for sealingly enclosing a primary seal of check valves in which a housing is placed over a portion of the check valve for preventing seepage from the check valve. The valve includes a tubular extension having an open end, a cap closing the tubular extension open end, and a housing enclosing and surrounding the tubular extension to sealingly enclose a portion of the tubular extension.

7 Claims, 5 Drawing Sheets

APPARATUS FOR SEALINGLY ENCLOSING A CHECK VALVE

BACKGROUND

This invention generally relates to check valves, and more particularly relates to an apparatus for sealing leaking check valves.

Check valves are typically positioned in pipelines conveying gases and liquids such as oil, gas, air, and steam to prevent backflow. Backflow of the liquids or gases may result from pump trips or the like in which case the propelling force pushing the liquid or gas through the pipe is eliminated, resulting in such flow reversals. The typical construction of check valves includes a cylindrical valve body defining an axial passageway therethrough for fluid flow. The check valve also includes an integrally attached hollow tubular-like extension projecting generally perpendicularly from the pipe, the tubular extension having an open end. The open end of the tubular like extension is sealingly closed by a cap attached to the tubular extension by spaced-apart bolts positioned circumferentially around the cap. A gasket is interposed between the cap and tubular extension to prevent seepage externally of the check valve. A movable, hinged plunger is positioned within the valve body for controlling fluid flow through the passageway. The plunger includes a circular portion concentrically positioned within the valve body for preventing backflow through the valve body when the plunger is in the closed position. The plunger further includes a hinged arm rigidly attached at one end to the circular portion and hingedly or pivotally attached at its other end to the inner periphery surface of the tubular like extension. The hinged arm allows the circular portion to pivot or swing outwardly toward the tubular extension and out of the valve body passageway for allowing one-way flow through the pipe as is well known in the art. When backflow occurs, the circular portion returns to the central portion of the valve body to prevent backflow through the passageway.

Hazardous liquids and gases may flow through the pipeline and thus through the check valve. Therefore, due in part to environmental concerns, it has become increasingly important that the check valve be leak tight. It is desirable that liquids such as radioactive water flowing through pressurized water nuclear reactor pipelines not leak externally from the check valve in order to prevent any exposure of low level radiation to the environment. Pressurized water nuclear reactor pipelines are typically divided into two portions. One portion is the primary loop, which contains the radioactive water and a second portion is the secondary loop, isolated from the primary loop, which contains water that is essentially radiation free. It is equally desirable to have check valves on the secondary loop to mitigate any consequences of inadvertent pump trips, minimize pipe break accidents, and other system conditions such as slight leakages of water from the radioactive primary loop. In non-nuclear applications, valve leakage is a source of energy loss (i.e. steam leakage) and over time results in valve cap and body erosion.

The interface between the cap and the tubular extension created by bolting the cap to the tubular extension may create a flow path allowing liquids and gases to escape the check valve by flowing from the valve body passageway, into the tubular extension and along the interface between the cap and tubular extension. Thus, seepage is most likely to occur, if at all, through this interface. Seepage can occur due to factors such as poor assembly, gasket aging, or thermal pressure gradients.

A prior art solution for seepage from the check valve has been to seal the interface between the tubular extension and cap seal. There are two methods of implementing such a construction. One such method places a weld on the interface to seal the interface. Another method utilizes a double welded device. To utilize such a double welded device, an enclosing housing for the bolts and gasket interface of hollow toroidal configurations is welded to the tubular extension at two locations to enclose the interface. One of the latter locations being at the valve body side of the interface (i.e. to the tubular extension) and the other weld located at the toroidal housing interface with the cap and positioned inwardly of the bolts.

Recent regulations, such as Institute of Nuclear Power Operations' Significant Operating Experience Report 86-3, now recommends periodic inspection of the check valves to ensure integrity of valve (ie, that the valve is leak-tight). Such recommendations are in part a response to the concerns that the valve properly operate, particularly in nuclear reactor applications. To achieve this objective, frequent preventive maintenance inspections of the check valve are performed. The weldment formed during the one weld construction, as previously discussed, is difficult to grind out without damaging the seal between the cap and the tubular extension in performing such inspections and involves a time-consuming and tedious grinding process. Because the seal is welded it is difficult to grind out the weld without compromising the seal. The weldments formed during the double weld construction are also difficult to remove because two grinding processes are involved and damage may result to the cap or the tubular extension in the grinding process performed during such inspections. Such difficulty in removing the weldments of the double weld construction is in part due to an acute grinding angle.

Therefore, what is needed is an improved apparatus for sealingly enclosing the interface between the tubular extension and the cap to ensure that external seepage from the check valve is prevented, should the elastomeric seal become degraded or should it not be seated properly after routine maintenance activity.

BRIEF DESCRIPTION OF THE DRAWINGS

While this specification concludes with claims particularly pointing out and distinctly claiming the subject matter of the invention, it is believed the invention will be better understood from the following description, taken in conjunction with the accompanying drawings wherein:

SUMMARY OF THE INVENTION

Disclosed herein is an apparatus for sealingly enclosing a check valve. The apparatus comprises a valve body including tubular extension having an open end; a cap closing the open end of the tubular extension; and a seal housing enclosing and surrounding said tubular extension to sealingly enclose the tubular extension. The seal housing functions as a holding receptacle for any liquids or gases flowing out of the check valve and can be removed for inspection or servicing without compromising the housing or tubular extension.

An object of the present invention is to provide a sealed check valve where the seal is formed by a seal housing located to enclose and surround a portion of the check valve with the seal housing welded to the check valve.

A feature of the present invention is the provision of a check valve body an enclosing seal housing which functions as a holding receptacle for liquids or gases escaping from the check valve.

An advantage of the present invention is the provision of a sealed check valve having a seal housing that prevents seepage should the elastomeric seal become degraded or should it not be properly seated after routine maintenance or inspection.

DETAILED DESCRIPTION OF THE PREFERRED EMBODIMENTS

Figure 1:
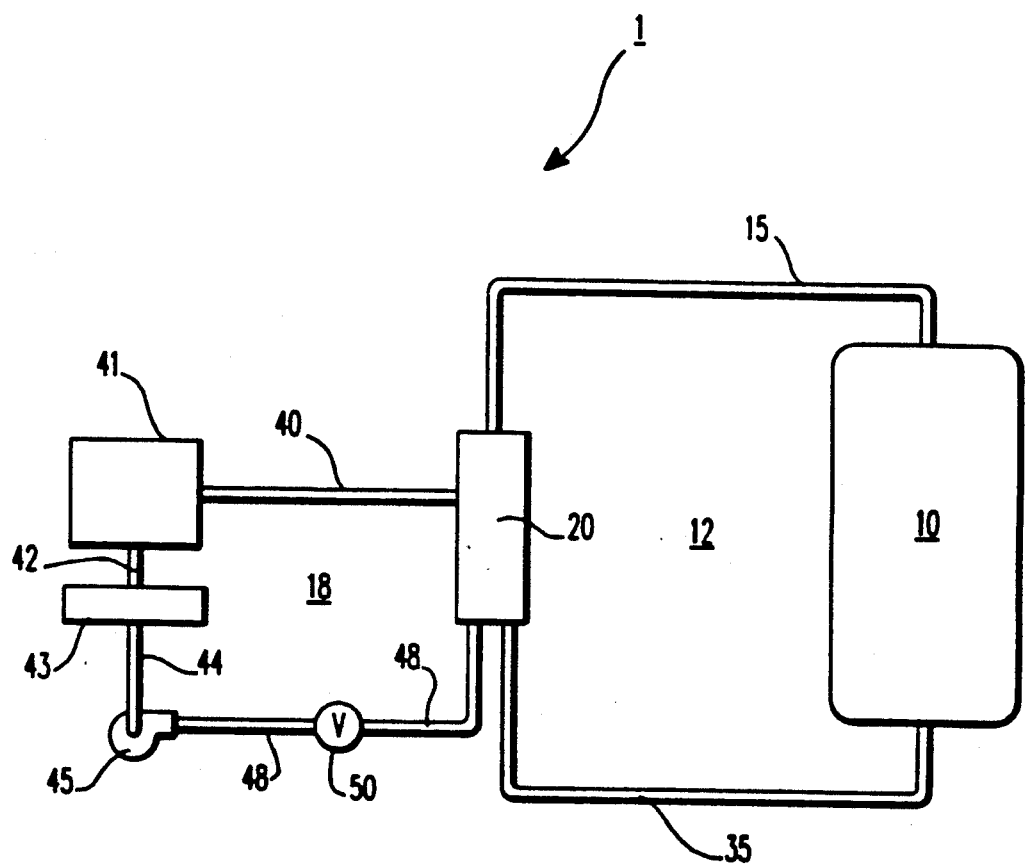
FIG. 1 is a schematic of a portion of a pressurized water nuclear reactor with portions removed for clarity.

Referring now to the drawings wherein like reference numerals refer to like elements, FIG. 1 depicts a portion of a nuclear plant facility, such as a pressurized water nuclear reactor 1 containing a reactor, generally referred to as 10, for generating heat by nuclear reactions. Typically, a primary coolant such as boronated water (not shown) inside reactor 10 functions to control the nuclear reaction process and to convey the generated heat away from reactor 10. The primary coolant, which may become radioactive, in reactor 10 flows through a portion of a closed loop, generally referred to as a primary loop 12. Referring to such primary loop 12, the primary coolant flows out of reactor 10 through pipe 15 to a steam generator 20 wherein the primary coolant, heated by reactor 10, transfers its heat to a water-filled secondary system, generally referred to as 18. Steam is created in steam generator 20 from water in the secondary system 18 and is conveyed to a turbine-generator set. In the primary loop 12, the primary coolant exits steam generator 20 via pipe 35 and returns to reactor 10 to repeat the above described cycle. With respect to the secondary system 18, the steam of the secondary system is isolated from the primary coolant and exits steam generator 20 via steam line 40 and is conveyed to an energy utilization device such as a steam turbine 41 which in conjunction with an electrical generator (not shown) produces electricity. Once entering turbine 41, the steam turns turbine blades (not shown) and then exits turbine 41 via pipe 42 and flows into condenser 43. Once in condenser 43, the steam is condensed back to water and is conveyed through pipe 44 to pump 45 which pumps the water through pipe 48 and a check valve 50 back to steam generator 20. If pump 45 trips (i.e., ceases to operate), check valve 50 will close preventing water from draining steam generator 20. If check valve 50 fails to close, the water would drain out of generator 20 causing steam generator 20 to boil dry which creates overheating possibly damaging steam generator 20.

Figure 2:
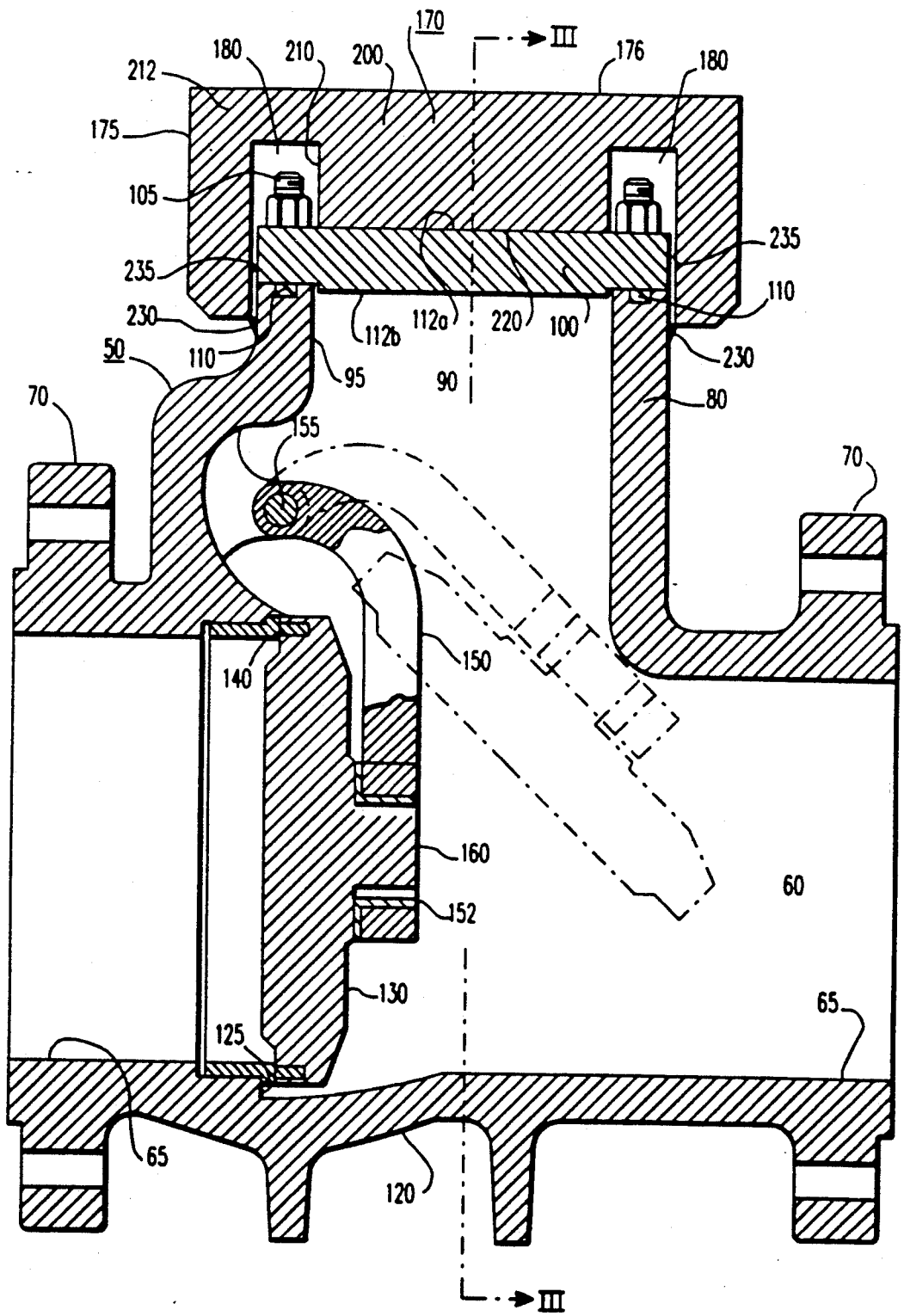
FIG. 2 is a view in vertical section of a check valve embodying this invention.

Referring to FIG. 2, check valve 50 is shown having a generally cylindrical and annular body 60 having generally cylindrical pipe line bolting flanges 70 integrally attached at both ends thereof. Pipe body 60 defines a cylindrical fluid passageway 65 therethrough. Integrally attached to and radially or perpendicularly extending outwardly from body 60 is a generally cylindrical tubular like extension 80 defining an axial bore 90 therethrough, having an open end 95. Tubular extension 80 provides access to the interior of check valve 50 for inspection and servicing. Bore 90 is closed, when in service, by a generally circular plate-like bonnet or cap 100 that extends across open end 95. The invention includes interacting means comprising bolts 105 and gasket ring 110. In this regard, cap 100 is attached to extension 80 by bolts 105. Gasket ring 110 is interposed between cap 100 and tubular extension 80 for sealing the interface between cap 100 and tubular extension 80. Cap 100 has two generally flat sides 112 a and b which are generally parallel to each other separated by a wall thickness.

Still referring to FIG. 2, substantially throughout its length, body 60 is substantially the same internal diameter as the conduit to which it is connected, but has a circumferentially enlarged intermediate wall portion 120 adjacent the central portion of body 60. This enlarged portion is relatively short and arcuately shaped in longitudinal cross section and defines an annular shoulder 125 at one end of body 60 and merges with the other end portion of body 60 at its other end. Positioned inside body 60 is a generally circular disc 130 having a diameter substantially conforming to the interior diameter of body 60. Disc 130 is sized such that its peripheral portion may engage an annular lip portion 140. Lip portion 140 extends circumferentially within body 60 and is integrally attached to shoulder 120 for providing a seat that is engaged by disc 130 when disc 130 is in the closed position. An elongated disc arm 150 is rigidly attached at one end 152 thereof, such as by a bolt (not shown), to disc 130 and pivotally mounted at the other end thereof to the inner periphery of tubular extension 80 by a hinge means such as a pin 155. Hinge means 155 functions to allow pivoting movement of disc 130 about hinged means 155. As shown in phantom, to allow fluid flow through passageway 65 body 60, disc 130 swings outwardly toward tubular extension 80 until a portion 160 of disc arm 150 abuts the interior wall of body 60. Thus, the interior wall of body 60 functions as a stop for disc arm 150.

Referring to FIGS. 2, 3, 4A, and 4B, tubular extension 80 is shown extending radially from body 60 and having its open end 95 covered by cap 100. Gasket 110 is interposed at the interface between cap 100 and tubular extension 80. A cup shaped seal housing 170 is positioned over cap 100 with outer periphery portion 175 of seal housing 170 extending toward body 60 to circumferentially surround the open end portion 95 of tubular extension 80. Seal housing 170 has a generally flat, circular top surface 176. A hollowed out portion or annular groove 180 is disposed adjacent outer periphery portion 175 and extends circumferentially within outer periphery portion 175 for receiving a portion of bolts 105. Housing 170 further includes a solid cylindrical inner portion 200 integrally attached to periphery portion 175. When housing 170 is mounted on cap 100, inner portion 200 is mounted on a portion of cap 100 for providing additional force on cap 100 to supplement the force exerted by bolts 105 to secure cap 100 to tubular extension 80. Inner portion 200 includes a circumference 210 which forms a boundary to groove 180 and a generally flat circular bottom 220 that firmly abuts cap 100. Inner portion 200 has a laterally extending arm portion 212 integrally formed thereon and extending over bolts 105, arm portion 212 also being integral with outer peripheral portion 175. An attachment means 230 such as a seal weld is circumferentially interposed between outer periphery portion 175 and tubular extension 80 for sealingly attaching housing 170 to tubular extension 80. After welding, housing 170 provides a receptacle for containing any gases or liquids seeping out of tubular extension 80 such as around bolts 105 or tubular extension 80/ cap 100 seal as described below.

Figure 3:
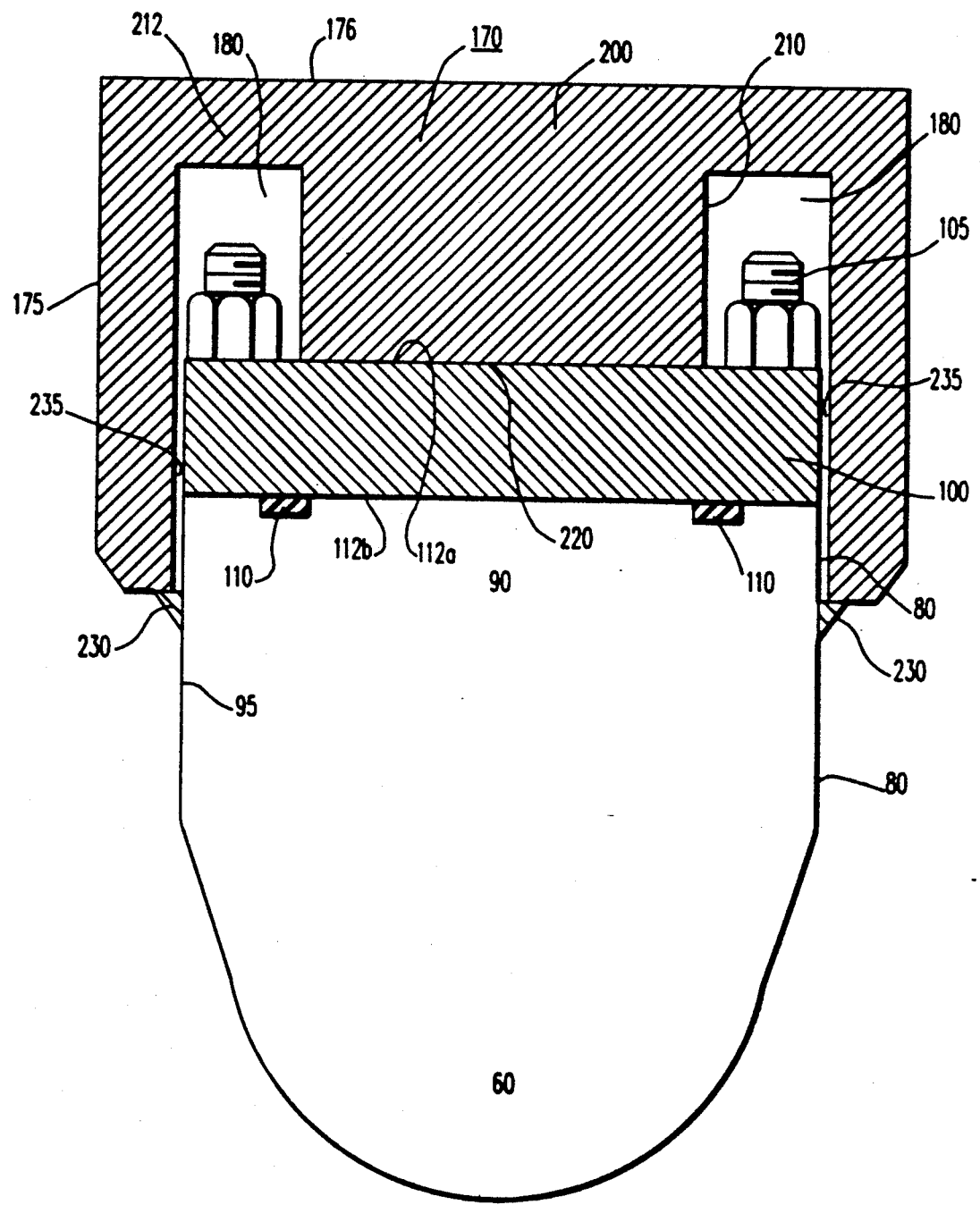
FIG. 3 is a view in vertical section of the check valve taken along section line III—III of FIG. 2 illustrating another view of the seal housing of the present invention and having the body of the check valve shown in outline.
Figure 4A:
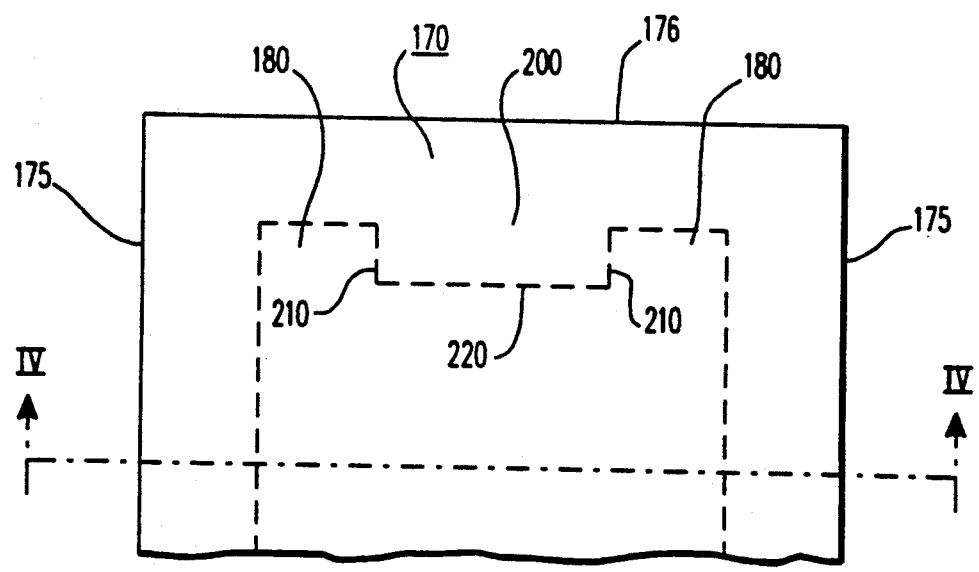
FIG. 4A is a view in vertical section of the seal housing of the present invention.
Figure 4B:
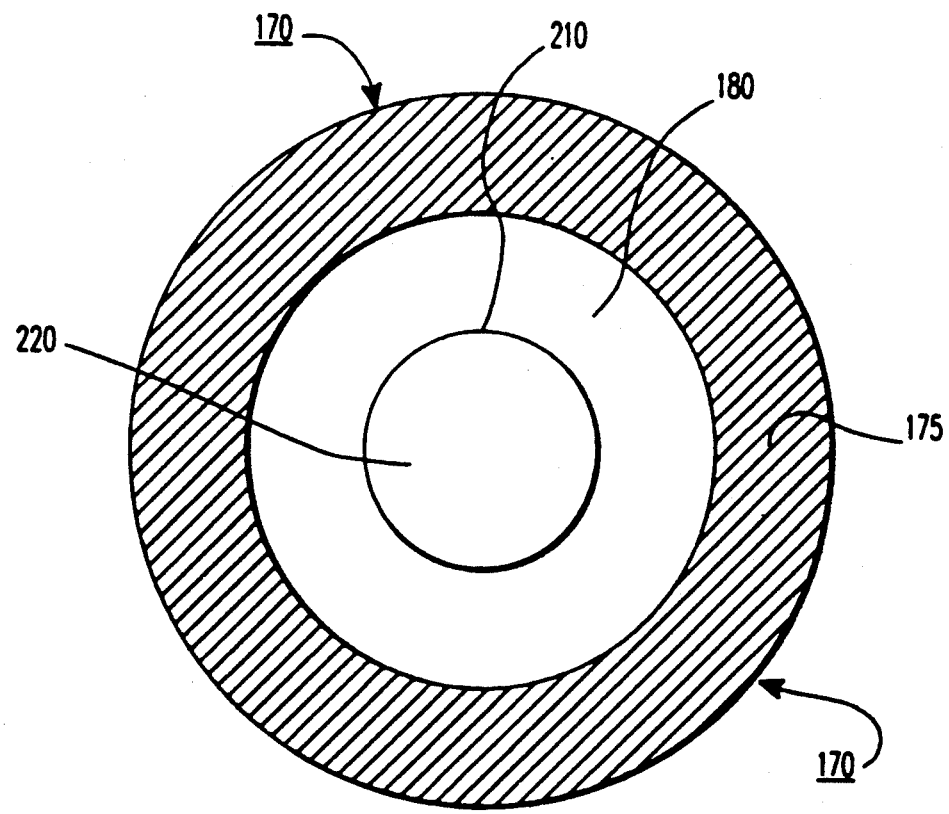
FIG. 4B is a sectional view taken along section line IVB—IVB of FIG. 4A illustrating the seal housing of the present invention.

Referring to FIG. 3, a flow path for such seepage is by gases or liquids flowing from body 60, through bore 90, toward the cap 100/ tubular extension 80 interface and then along the interface toward gasket 110. If gasket 110 becomes degraded or is not seated properly across the interface, the gas or liquid will flow across gasket 110 and then may branch into two flow paths. One such path flows outwardly along the threads of bolts 105 and into groove 180. The other branch continues to flow along cap 80/ tubular extension 80 interface and exits into gap 235 created between tubular extension 80 and outer periphery portion 175.

Figure 5A:
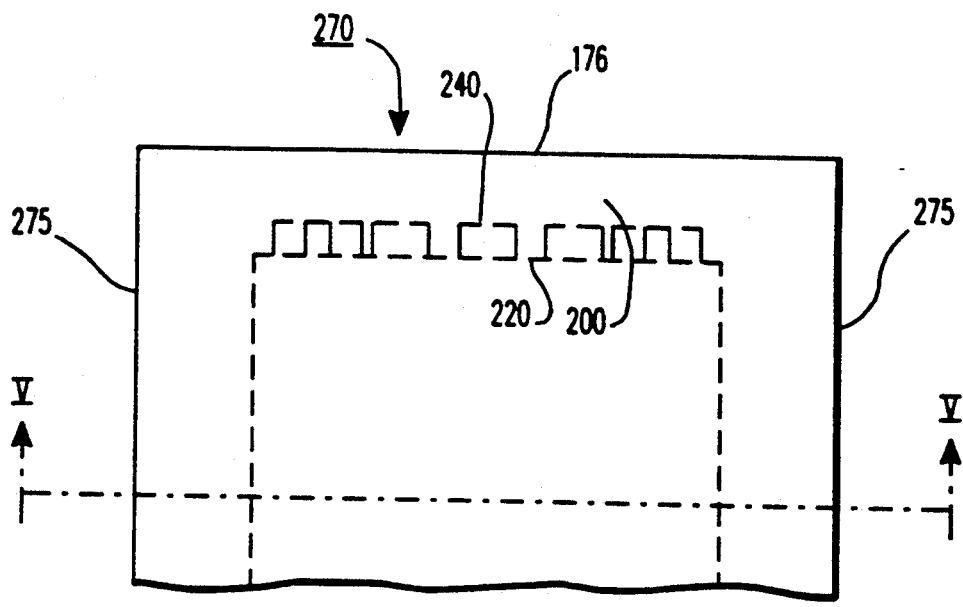
FIG. 5A is a view in vertical section of an alternative embodiment of a seal housing of the present invention.
Figure 5B:
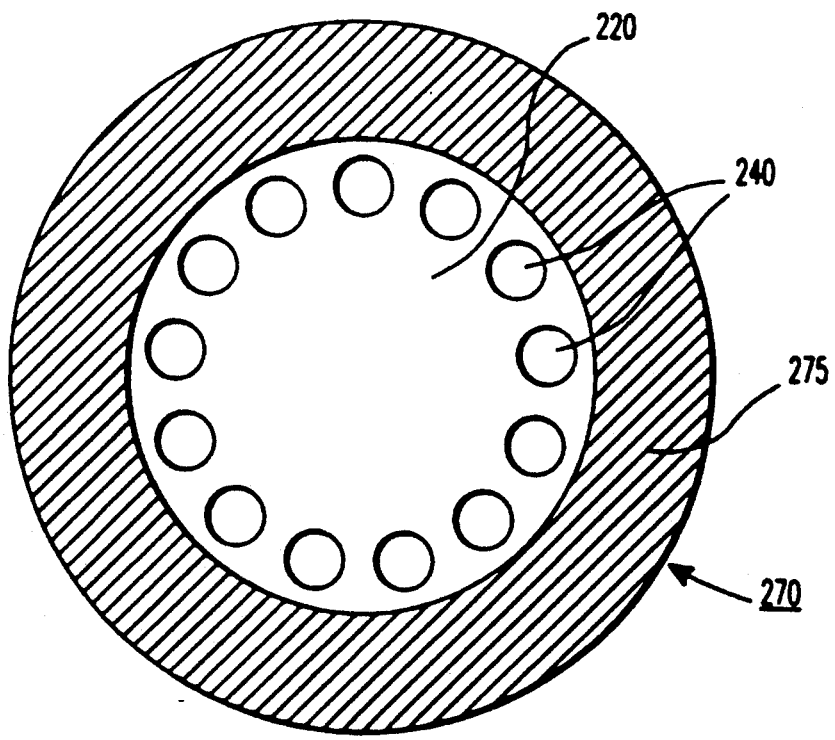
FIG. 5B is a sectional view taken along section line VB—VB of FIG. 5A illustrating the alternative seal housing of the present invention.

Referring to FIG. 5A, an alternative embodiment of seal housing 270 is illustrated and includes outer portion 275 extending outwardly from inner portion 200 for surrounding a portion of tubular extension 80 (FIG. 3). Inner portion 200 is substantially solid and has two oppositely disposed generally circular generally parallel surfaces 176/220 from the top wall of seal housing 270 inner portion 200 being formed integrally with outer portion 275. As best seen in FIG. 5B, inner portion 200 has a plurality of generally circular drilled holes 240 therein, slightly larger than bolts 105 (FIG. 3). As shown in FIG. 5A, holes 240 are spaced apart circumferentially in inner portion 200 to form a hollowed out portion providing a space into which a portion of bolts 105 (FIG. 3) may respectively project.

To use the above described apparatuses, seal housing 170 or 270 is positioned over cap 100 as described above. Outer periphery portion 175 or 275 is seal welded at its lower portion to tubular extension 80. After welding, seal housing 170 or 270 functions as a holding receptacle for any gases or liquids flowing out of check valve 50. To remove housing 170 or 270, weld 230 is removed by a suitable tool and seal housing 170 or 270 is manually lifted away from cap 100. A plurality of bolts 105 are removed allowing cap 100 to be manually forced from tubular extension 80 so that check valve 50 can be inspected through opening 95. To reinstall seal housing 170 or 270, cap 100 is attached to tubular extension 80 by a plurality of bolts 105. Seal housing 170 or 270 is positioned over cap 100 and the outer periphery portion is again welded to tubular extension 80.

Although the invention is fully described herein, it is not intended that the invention as illustrated and described be limited to the details shown, because various modifications may be obtained with respect to the invention without departing from the spirit of the invention or the scope of equivalents thereof. For example, the outer portion 175 of housing 170 may extend over the entire tubular extension 80 and over a portion of body 60 and be attached to body 60 by securing means 230 for sealingly enclosing check valves 50. In another example, attachment means 230 may encompass compressing outer portion 175 to press firmly against tubular extension 80 for sealingly enclosing check valve 50. In a still further example, cap 100 and tubular extension 80 may have threads, allowing cap 100 to screw onto tubular extension 80 therefore eliminating the need for groove 180 or circular holes 240.

Therefore, what is provided is an improved apparatus for sealingly enclosing the interface between the tubular extension and the cap such that seepage from the check valve into the environment is prevented when the elastomeric seal is degraded or not seated properly after routine maintenance or inspection.

What is claimed is:

1. A check valve having a construction to eliminate leakage during valve operation, the check valve comprising:
   (a) a valve body having a passageway therethrough;
   (b) a disc disposed in the valve body and movable between a first position for blocking said passageway to prevent flow of a material therethrough and a second position out of said passageway to allow material to flow therethrough;
   (c) a tubular shaped extension extending generally radially from said valve body and having a first end portion communicating with said passageway in said valve body and an opposite, open end portion;
   (d) a solid cap sealingly connected with the open end of said tubular shaped extension for closing the open end portion and providing a primary seal to prevent material within said passageway from leaking through said open end portion; and
   (e) a cup shaped housing having an inner solid portion disposed in abutting contact with said cap and an outer annular peripheral portion integral with and extending from said inner portion and in surrounding relation with a portion of an outer surface of said tubular extension; the outer peripheral portion being hermetically welded to the outer surface of said tubular extension to provide a secondary seal to prevent material within said passageway from leaking through said open end portion and said primary seal in the event said primary seal fails.

2. The check valve of claim 1 wherein said solid cap is sealingly connected to said tubular extension via a plurality of bolts positioned along a peripheral edge of said cap and secured to said tubular extension.

3. The check valve of claim 2 wherein said housing includes a continuous recessed groove disposed between the outer peripheral portion and the inner portion for receiving a portion of said bolts.

4. The check valve of claim 2 wherein said bolts include outwardly extending bolt heads and said housing includes a plurality of generally cylindrical hollowed out portions disposed between the outer peripheral portion and the inner portion for receiving said bolt heads.

5. A check valve having a construction to eliminate leakage during operation, the check valve comprising:

(a) a generally annular valve body having a passageway therethrough;

(b) a disc disposed in the valve body and movable between a first position for blocking said passageway to prevent flow of a material therethrough and a second position out of said passageway to allow material to flow therethrough;

(c) a generally annular tubular extension extending generally radially from said valve body and having a first end portion communicating with said passageway in said valve body and an opposite, open end portion;

(d) a generally circular cap abuttingly mounted atop the open end of said tubular extension for sealing the open end thereof;

(e) a plurality of bolts disposed circumferentially around said cap for sealingly attaching said cap to said tubular extension and thereby providing a primary seal to prevent material within said passageway from leaking through said open end portion; and (f) a cup shaped housing having an inner solid portion disposed in abutting contact with said cap and an outer annular peripheral portion integral with and extending from said inner portion and in surrounding relation with a portion of an outer surface of said tubular extension; the outer peripheral portion being hermetically welded to the outer surface of said tubular extension to provide a secondary seal to prevent material within said passageway from leaking through said open end portion and said primary seal in the event said primary seal fails.

6. The check valve of claim 5 wherein said cup shaped housing has a continuous circumferentially extending groove formed therein for receiving a portion of said bolts.

7. The check valve of claim 5 wherein said cup shaped housing has a plurality of circumferentially spaced-apart cylindrical holes formed therein for receiving a portion of said bolts.

* * * * *